(12) United States Patent
Sobue et al.

(10) Patent No.: US 7,277,113 B2
(45) Date of Patent: Oct. 2, 2007

(54) METHOD AND APPARATUS FOR IMAGE FORMING

(75) Inventors: Fumitaka Sobue, Ibaraki-ken (JP); Masayoshi Taira, Chiba-ken (JP); Toshifumi Kakutani, Ibaraki-ken (JP); Takashi Sugiura, Chiba-ken (JP); Shinichi Takata, Chiba-ken (JP); Yushi Oka, Chiba-ken (JP); Naohisa Nagata, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 11/087,653

(22) Filed: Mar. 24, 2005

(65) Prior Publication Data

US 2005/0212901 A1    Sep. 29, 2005

(30) Foreign Application Priority Data

Mar. 29, 2004    (JP)    ............... 2004-096651

(51) Int. Cl.
   *B41J 2/435*    (2006.01)
   *B41J 2/47*    (2006.01)
(52) U.S. Cl. ..................... 347/250; 347/235
(58) Field of Classification Search ............... 347/250, 347/235
   See application file for complete search history.

(56) References Cited

U.S. PATENT DOCUMENTS 5,105,077 A * 4/1992 Asada .................. 250/205
6,381,078 B1 * 4/2002 Yamaguchi et al. ......... 359/738
6,429,424 B1 * 8/2002 Park ..................... 250/236
6,847,390 B2 * 1/2005 Maeda ................... 347/250
7,015,940 B1 * 3/2006 Kimura .................. 347/250
2003/0214568 A1 * 11/2003 Nishikawa et al. ......... 347/116
2005/0271411 A1   12/2005 Shibaki et al.

FOREIGN PATENT DOCUMENTS

| JP | 8-304723 | 11/1996 |
| JP | 2004-58492 | 2/2004 |

* cited by examiner

*Primary Examiner*—Hai Pham
*Assistant Examiner*—Kainoa Wright
(74) *Attorney, Agent, or Firm*—Fitzpatrick, Cella, Harper & Scinto

(57) ABSTRACT

An image forming apparatus in which the intensity of a light beam used to form a latent image is switched in response to a change in resolution. A laser emits a light beam for forming a latent image on a photosensitive drum. A polygon mirror scans the emitted light beam. BD sensors detect the scanned beam. A timing controller selects the preferable timing from a storage device table according to the intensity of the light beam or the resolution when controlling the light emission timing of the lasers in response to a detection of timing of the detected light beam.

6 Claims, 14 Drawing Sheets

F I G. 1
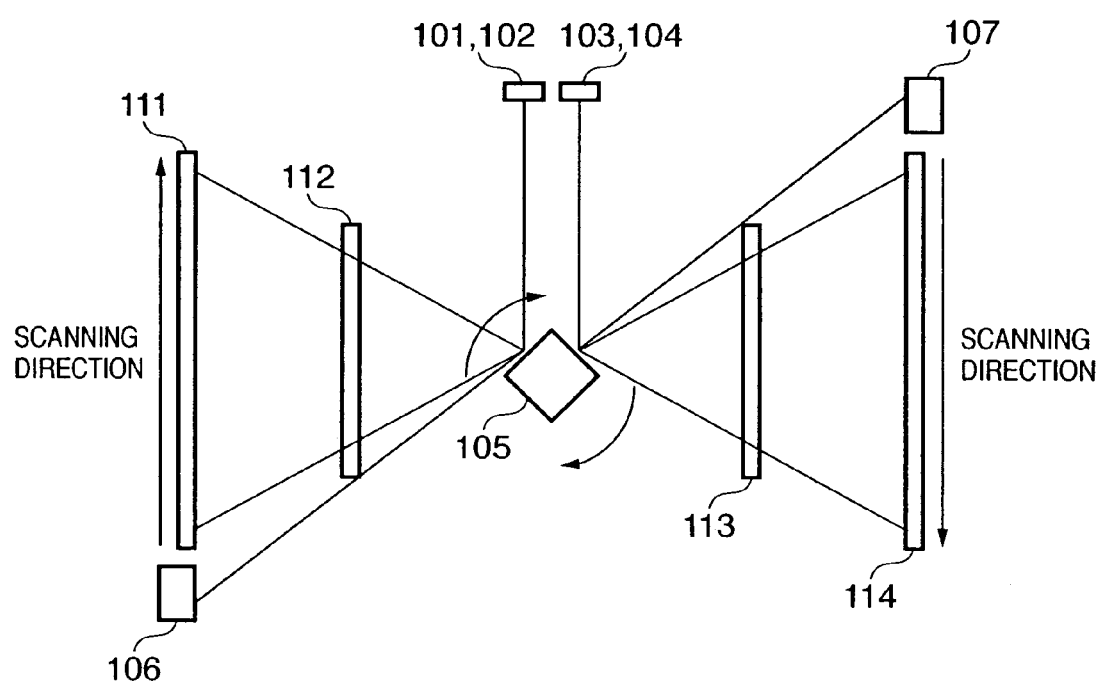

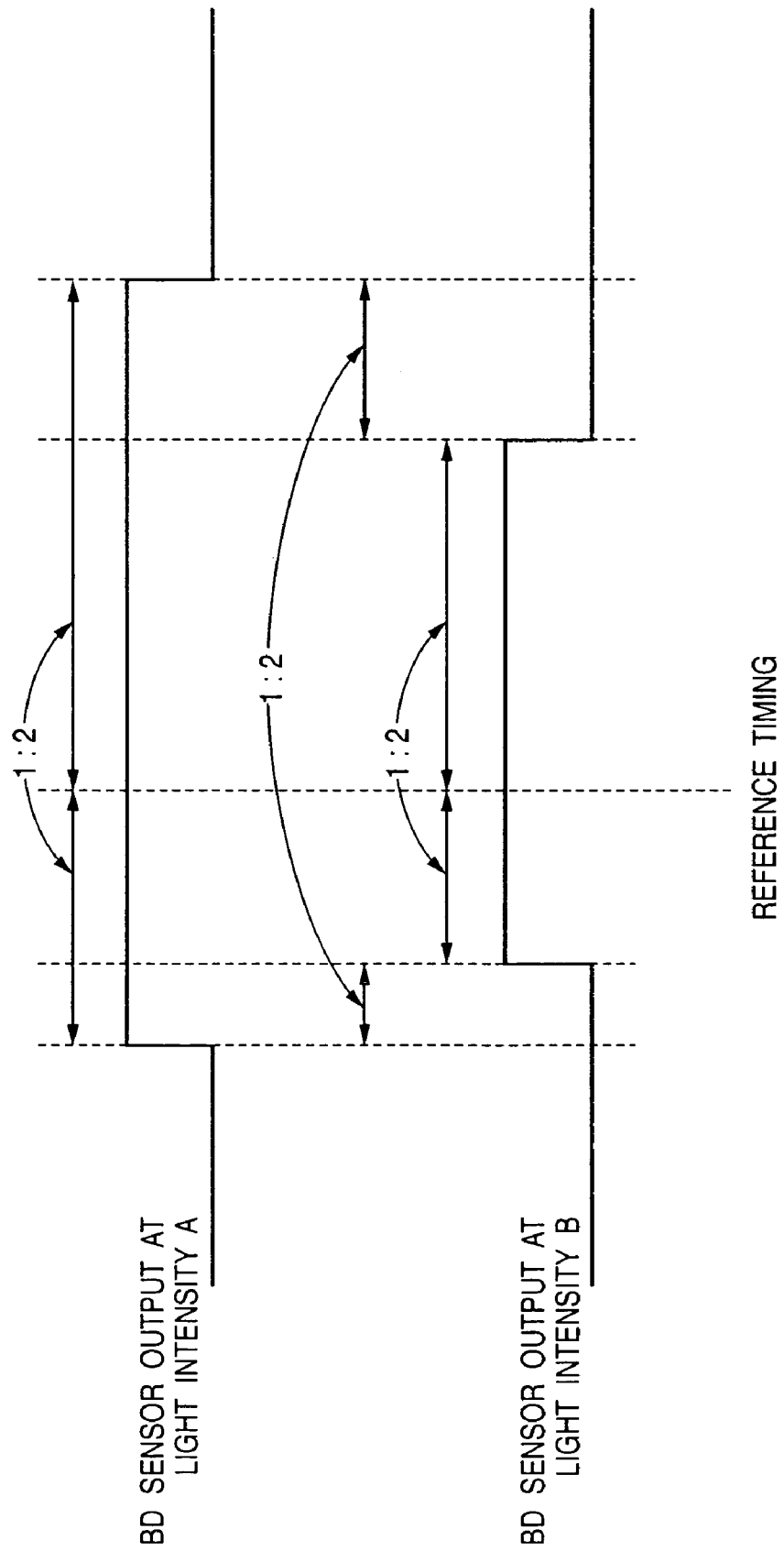

METHOD AND APPARATUS FOR IMAGE FORMING

FIELD OF THE INVENTION

This invention relates to an image forming technology that forms an image using a light beam such as a laser beam.

BACKGROUND OF THE INVENTION

Conventionally, an image forming apparatus is known that, by switching resolution, can form a high resolution image (for example, of 1200 dpi) and a low resolution image (for example, of 600 dpi).

In a case in which the rotation speed of a polygon mirror is the same when forming an image of 600 dpi and when forming an image of 1200 dpi, the rotation speed of a photosensitive drum at 1200 dpi is set at ½ that at 600 dpi. In addition, when the integrated light intensity of the laser scanning the photosensitive drum is the same in both 600 dpi and 1200 dpi directions, the laser light intensity at 1200 dpi is set at half that at 600 dpi, and furthermore, it is necessary to double the frequency of the image clock that drives the laser. By these adjustments, a 1200 dpi image is formed in both the main scanning direction and the sub-scanning direction.

However, when forming an image, it is usually necessary to form the image starting from the same position, and therefore horizontal synch and vertical synch must be obtained. If the horizontal synch is not gotten correctly, the image shifts in the horizontal direction.

In order to obtain the horizontal sync, there is a method whereby, when scanning the photosensitive drum with a light beam from the polygon mirror, the horizontal sync signal is output when the light beam is detected by photo detectors provided near the edges of the photosensitive drum.

However, if the intensity of the light beam is switched according to the resolution, the horizontal sync signal shifts because the configuration is such that the horizontal sync signal is output when the integrated light intensity of the light beam directed onto the photo detectors reaches a certain value. In other words, when the light intensity is high, the horizontal sync signal is output relatively quickly, and when the light intensity is low, the horizontal sync signal is output relatively slowly.

In order to solve this problem, a technology is proposed (Japanese Laid-Open Patent Publication No. 8-304723) that adjusts the light intensity, varying the intensity of the light beam according to the resolution when scanning the photosensitive drum while maintaining the intensity of the light beam at a constant level when the light beam scans the photo detectors provided at the edges of the photosensitive drum. In other words, this technique requires switching the light intensity not only when changing the resolution but also during a single scan.

However, in a color image forming apparatus, equipped with a plurality of lasers, the lasers are allocated to each of the colors, e.g., cyan, magenta, yellow, and black. Moreover, in order to reduce the number of polygon mirrors, in some cases the plurality of lasers are scanned in different directions (e.g., Japanese Laid-Open Patent Publication No. 2004-058492). For example, while the yellow laser scans toward the right, the magenta laser scans to the left. In an instance such as this, any shift in the position at which an image is drawn due to differences in resolution described above (that is, differences in light intensity) is doubled because each shift occurs in the opposite direction. Moreover, this shift is expressed as color shift, and thus seriously degrades the quality of the formed image.

There is a possibility that the foregoing problem can be solved by application of the method described in Japanese Laid-Open Patent Publication No. 8-304723. However, since this method requires two circuits, i.e., one circuit that sets the light intensity when scanning the photosensitive drum and another circuit that sets the light intensity when scanning the photo detectors, circuit scale increases, leading unavoidably to an increase in cost.

SUMMARY OF THE INVENTION

Accordingly, the present invention has as an object to solve these and other problems, such other problems becoming apparent upon a reading of the entire specification.

In order to solve the above-described problems, the present invention arranges matters so as to select the preferable light emission timing according to differences in light beam intensity or resolution, when controlling the light emission timing of a light emission unit according to a detection timing of a light beam detected by the photo detectors.

The present invention arranges matters so as to select the preferable light emission timing according to differences in light beam intensity and resolution, and therefore light intensity control for changing the light intensity when the light beam scans the photosensitive drum and when the light beam scans the photo detectors can be eliminated. In addition, cost can be reduced while reducing shift of the position at which an image starts to be drawn.

Other features, objects and advantages of the present invention are apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram showing an example of an optical scanning apparatus of a color image forming apparatus capable of adapting the invention according to the present embodiment;

FIG. 14 is a diagram showing a reference timing determination principle according to the present embodiment.

DETAILED DESCRIPTION OF THE PREFERRED EMBODIMENTS

Figure 2:
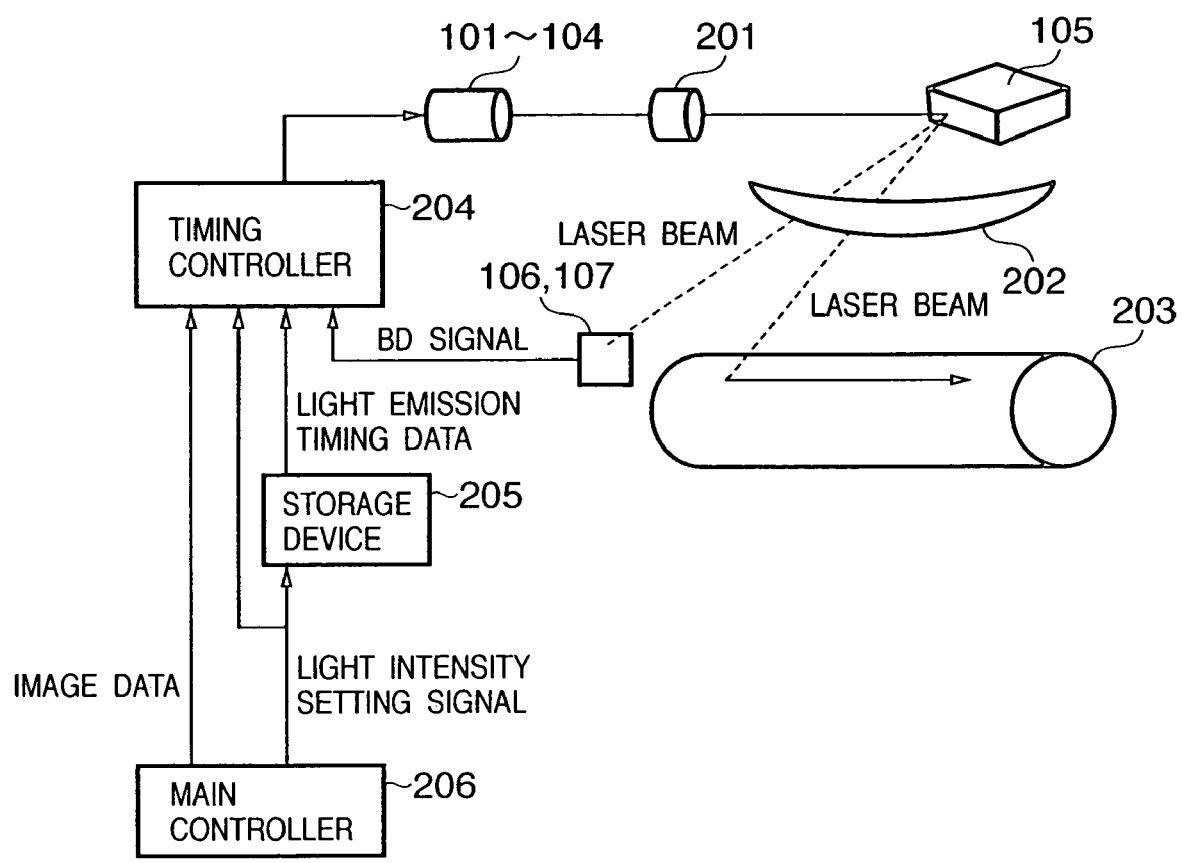
FIG. 2 is a diagram showing an example of a timing controller and an optical scanning apparatus according to the present embodiment.

Preferred embodiments of the present invention will now be described in detail in accordance with the accompanying drawings.

The following illustrates an embodiment useful to an understanding of the generic concept, the intermediate concept, and the more specific concept of the present invention. It should be noted that not necessarily all the concepts contained in the following embodiment are recited in the claims. However, such omission is not an intentional removal from the claims of the patent invention, and it is to be understood that that which is not specifically recited in the claims may be equivalents of the patent invention.

First Embodiment

FIG. 1 is a diagram showing an example of an optical scanning apparatus of a color image forming apparatus capable of adapting the invention according to the present embodiment. Laser beams emitted from a yellow image forming semiconductor laser (hereinafter the yellow laser) 101, a magenta image forming semiconductor laser (hereinafter the magenta laser) 102, a cyan image forming semiconductor laser (hereinafter the cyan laser) 103, and a black image forming semiconductor laser (hereinafter the black laser) 104, respectively, are collected into parallel rays by a collimator lens, not shown, and scanned at equal angular speeds upon reflection by a polygon mirror 105 rotating at a constant rpm.

The laser beams reflected by the polygon mirror 105 pass through an fθ lens, not shown, are reflected by a yellow laser reflecting mirror 111, a magenta laser reflecting mirror 112, a cyan laser reflecting mirror 113 and a black laser reflecting mirror 114, respectively, and directed onto a photosensitive drum, not shown.

The image formation position on the photosensitive drum surface is determined by BD (beam detect) signals output from BD sensors 106, 107. The yellow/magenta BD sensor 106 detects the yellow laser beam in order to determine draw start timing each of the yellow laser 101 and the magenta laser 102. Then, individually fixed periods of time from the timing of the yellow laser beam emission are set as the draw start timing for yellow and magenta. Similarly, for the black laser 104 and the cyan laser 103 as well, fixed periods of time from the timing of the emission of the black laser beam toward the black/cyan BD sensor 107 are set as the draw start timing.

In such a configuration, when the light intensity is changed in conjunction with switching the resolution, the direction of shift is reversed, and therefore the extent of the shift doubles, and color shift in the main scanning direction can easily become noticeable. Accordingly, the remedial effects when adapting the present invention are great. However, the present invention is not limited to such a configuration, and can be adapted to an image forming apparatus that uses only a single laser or to an image forming apparatus that uses a plurality of lasers but in which the main scanning direction is the same.

FIG. 2 is a diagram showing an example of a timing controller and an optical scanning apparatus according to the present embodiment. For simplicity, the diagram shows only one of the plurality of lasers. Reference numeral 201 designates the collimator lens described above. Reference numeral 202 designates the fθ lens described above. Reference numeral 203 designates the photosensitive drum described above. Laser beams emitted from the lasers 101-104, respectively, are collected into parallel rays by passing through the collimator lens 201 and scanned at equal angular speeds by being reflected by the polygon mirror 105 that rotates at a fixed speed. Furthermore, the laser beams passing through the fθ lens 202 are directed onto the surface of the photosensitive drum 203 at equal speeds so as to form a latent image.

Reference numeral 204 designates a timing controller that controls the timing of the emissions of the lasers 101-104. Reference numeral 205 designates a storage device that stores data on emission timing according to light intensity setting signal. A main controller 206 is a control apparatus such as a printer controller that executes image formation or an engine controller that controls an image-forming engine. The main controller 206 outputs a light intensity setting signal in response to an instruction on resolution input from a host apparatus or a control panel. In addition, the timing controller 204, when it receives BD signals output from the BD sensors 106, 107, selects a corresponding light emission timing based on the light intensity setting signal (or, alternatively, resolution identification information) input from the main controller 206. For example, the timing controller 204 reads out from the storage device 205 the data for the light emission timing that corresponds to the light intensity setting signal, determines the light emission start timing based on the read-out light emission timing data and the BD signal pulse rise timing, and issues a light emission instruction in accordance with the light emission timing thus determined. Contained in the light emission timing data is such data as, for example, emit light at t1 seconds from the time the BD signal is received (that is, when the rise of the pulse of the BD signal is detected) at light intensity A, and emit light at t2 seconds from the time the BD signal is received at light intensity B.

Figure 3:
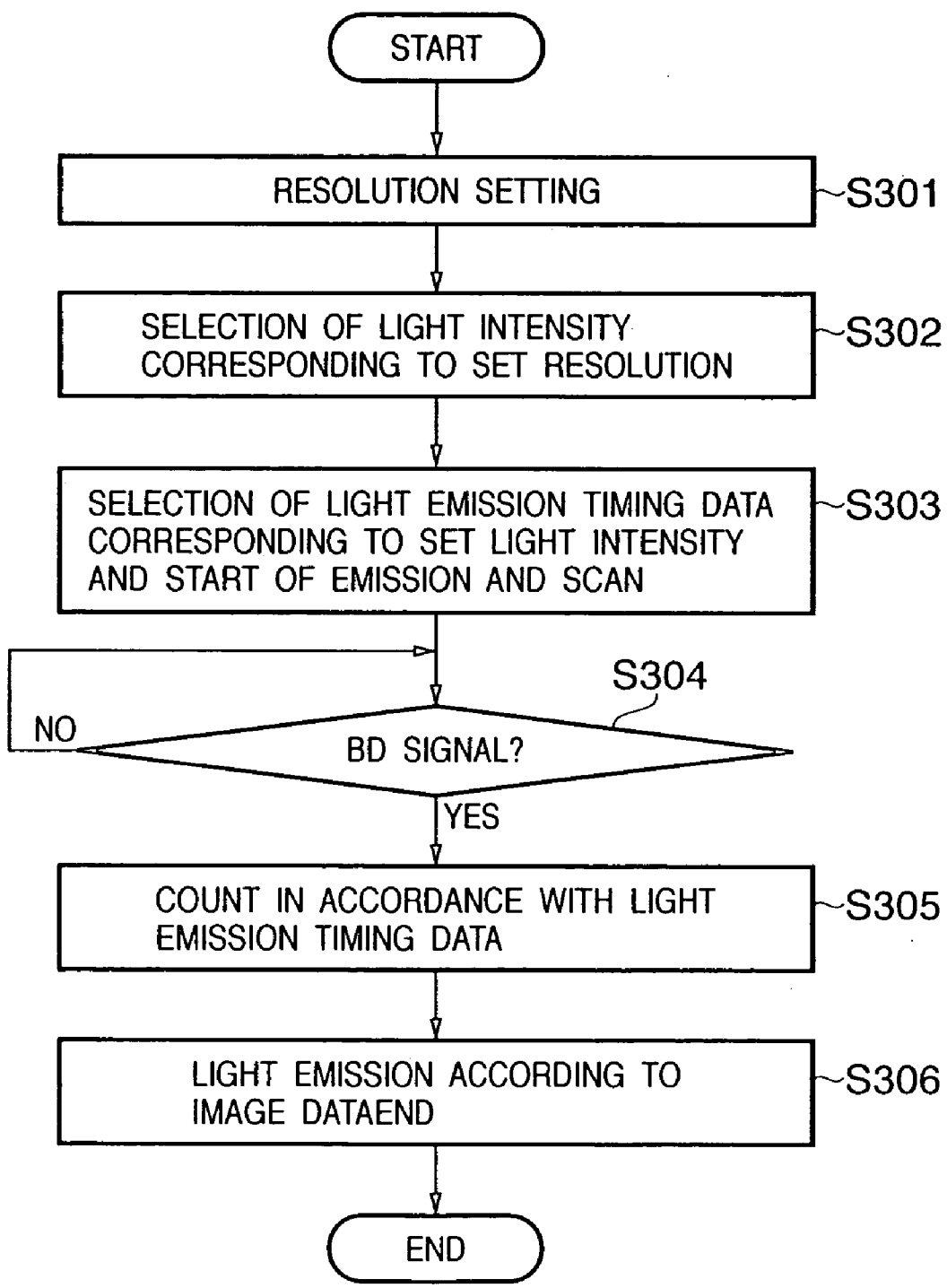
FIG. 3 is an illustrative flow chart relating to a light emission timing control process according to the present embodiment.

FIG. 3 is an illustrative flow chart relating to a light emission timing control process according to the present embodiment.

In step S301, the main controller 206 sets the resolution in response to an instruction from a host apparatus or a control panel.

In step S302, the main controller 206 selects the light intensity according to the resolution set in step S301. For example, a table indicating the relation between resolution and light intensity is stored in advance in a memory, not shown, provided in the main controller 206, and the main controller 206 reads out the light intensity corresponding to the set resolution from the table. The main controller 206 outputs a light intensity setting signal corresponding to the selected light intensity to the timing controller 204.

In step S303, the timing controller 204 selects the light emission timing corresponding to the aforementioned light intensity setting signal. For example, the timing controller 204 reads light emission timing data corresponding to the input light intensity setting signal from a table showing the relation between light intensity setting signal and light emission timing data stored in the storage device 205. The lasers 101-104 starts emission of the laser beam and the emitted beam is scanned by the rotating polygon mirror 105.

In step S304, the timing controller 204 determines whether or not BD signals from the BD sensors 106, 107 have been received. When a BD signal is received, the apparatus departs from a standby loop. It should be noted that the BD signals are output when the BD sensors 106, 107 are irradiated by a laser beam.

In step S305, the timing controller 204, using the BD signal as a reference, waits for the passage of a time period indicated by the light emission timing data. This time period is measured by a counter built into the controller 204. When the draw start timing arrives, the process proceeds to the next step.

In step S306, the timing controller 204 controls the light emission of the lasers 101-104 based on the image data and the light intensity setting signal.

Figure 4:
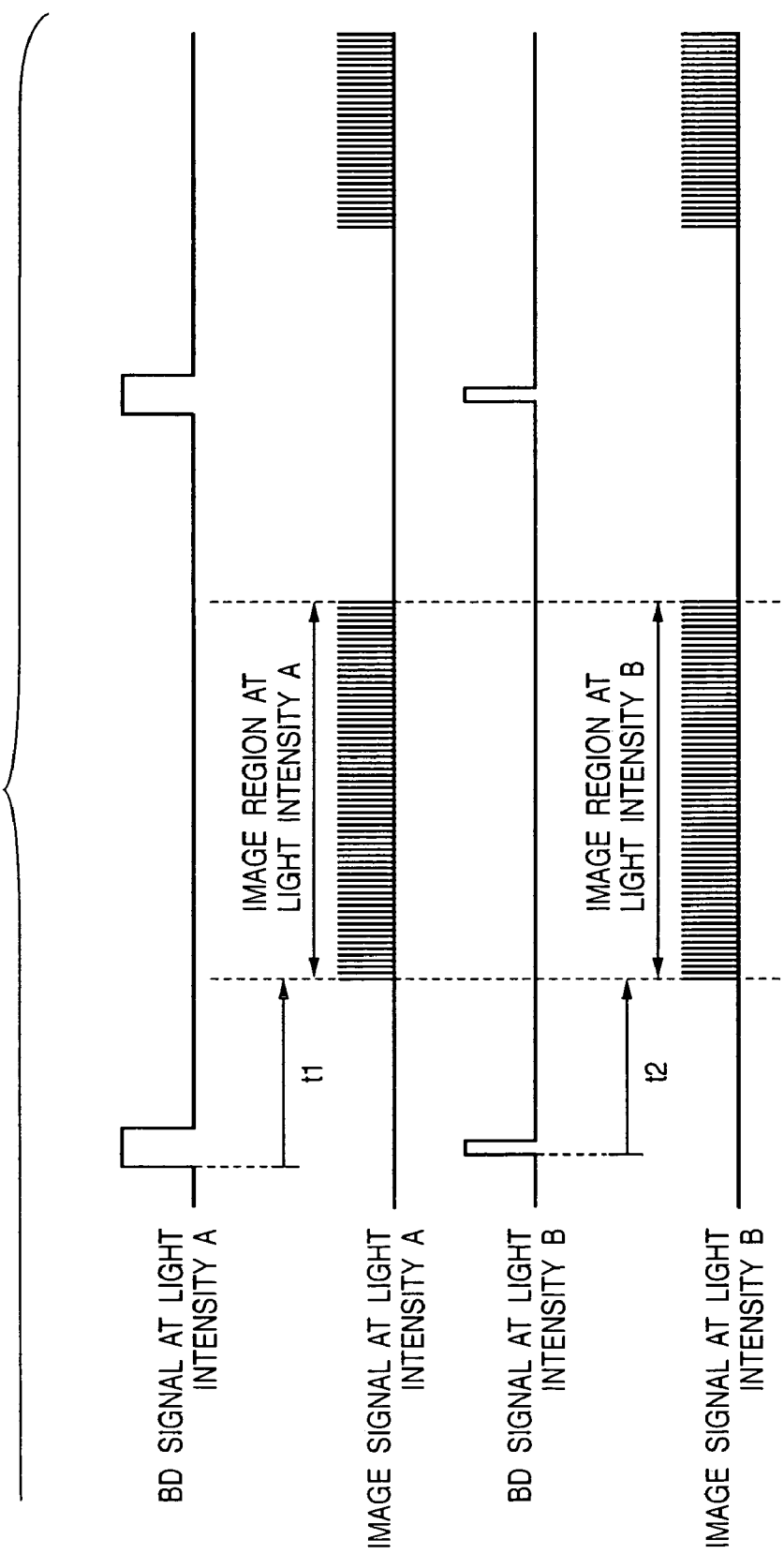
FIG. 4 is a diagram showing the relation between light intensity, BD signal and image signal.

FIG. 4 is a diagram showing the relation between light intensity, BD signal and image signal. In this example, at light intensity A the draw start timing is set after a time period t1 from the BD signal pulse rise timing, and at a light intensity B the draw start timing is set after a time period t2 from the BD signal pulse rise timing, so that, even if the light intensity changes, ultimately an image can be formed at the same timing. It should be noted that light intensity A and t1 are correlated and stored in the storage device 205 and light intensity B and t2 are correlated and stored in the storage device 205.

In order to illustrate the effects of the present invention, the following is a comparison of a conventional example and the present invention.

Figure 5:
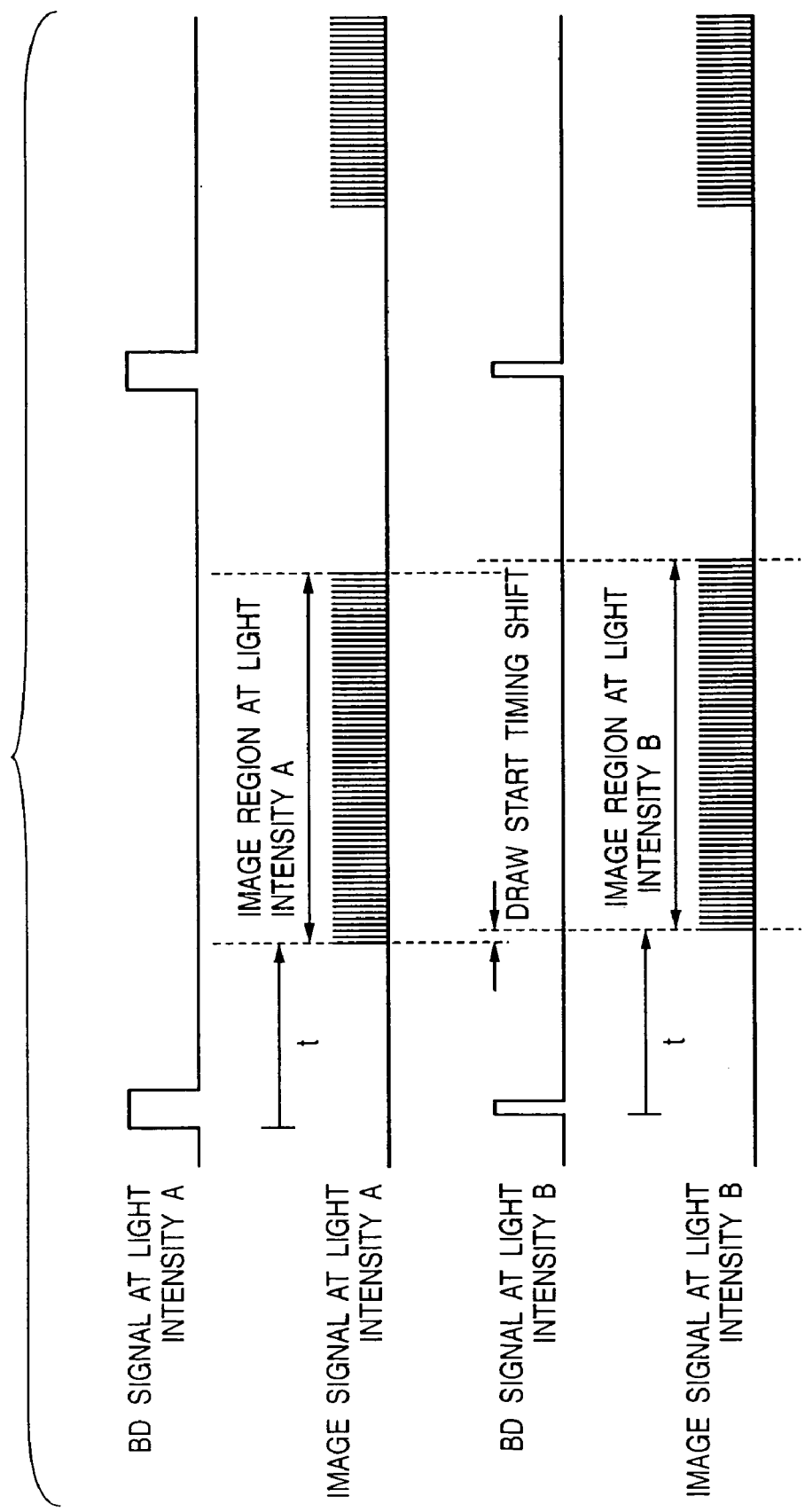
FIG. 5 is a diagram showing the relation between light intensity, BD signal and image signal in relation to a conventional example.

FIG. 5 is a diagram showing the relation between light intensity, BD signal and image signal in relation to the conventional example. According to the conventional art, the draw start timing is set at when a fixed time period t elapses after detection of a BD signal, and therefore the draw start timing at light intensity A and the draw start timing at light intensity B diverge. It is assumed here that light intensity A is greater than light intensity B.

Figure 6:
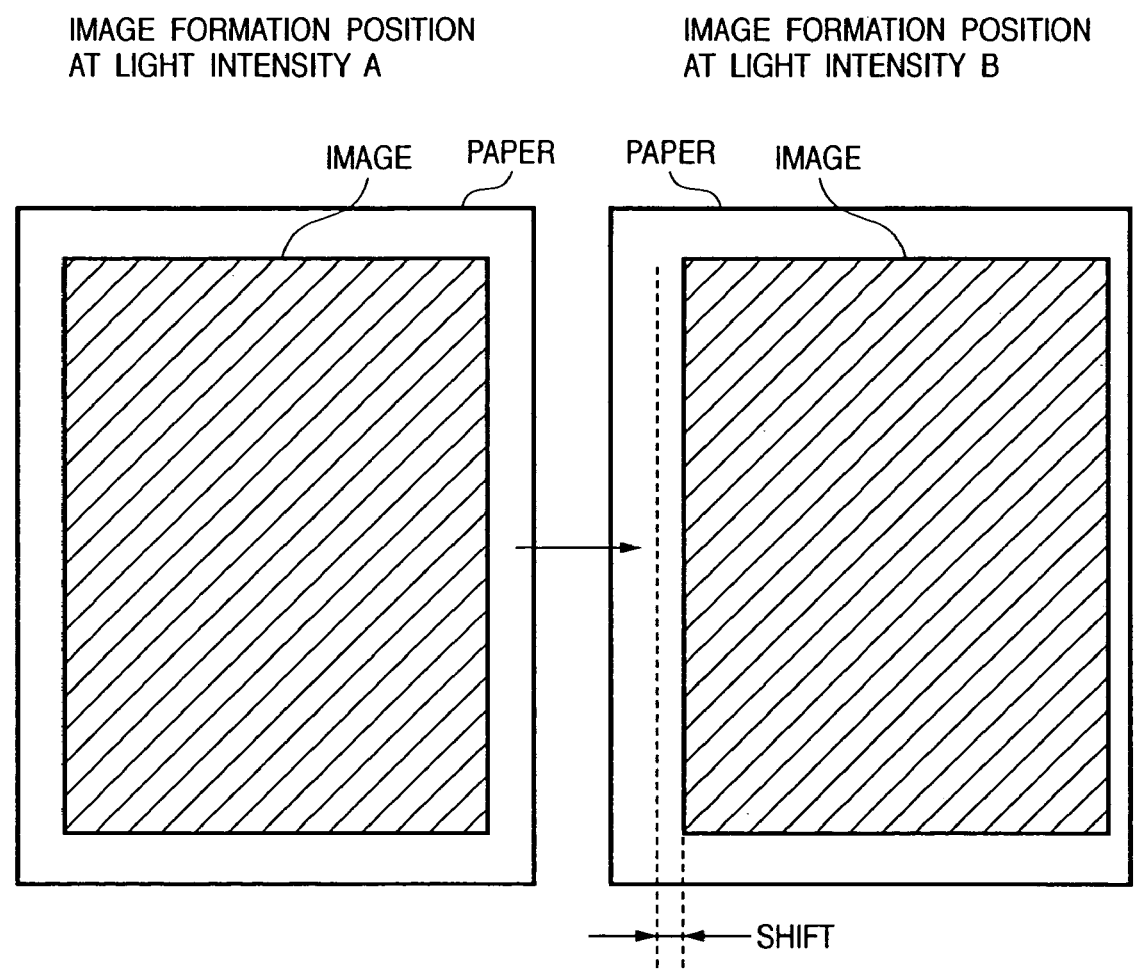
FIG. 6 is a diagram showing a formed image shift due to a draw start timing shift.

FIG. 6 is a diagram showing a formed image shift due to a draw start timing shift. In contrast to the image formed with light intensity A, the image formed with light intensity B shows shift in the drawing starting position in the main scanning direction (the horizontal direction), to a position corresponding to the draw start timing shift.

Figure 7:
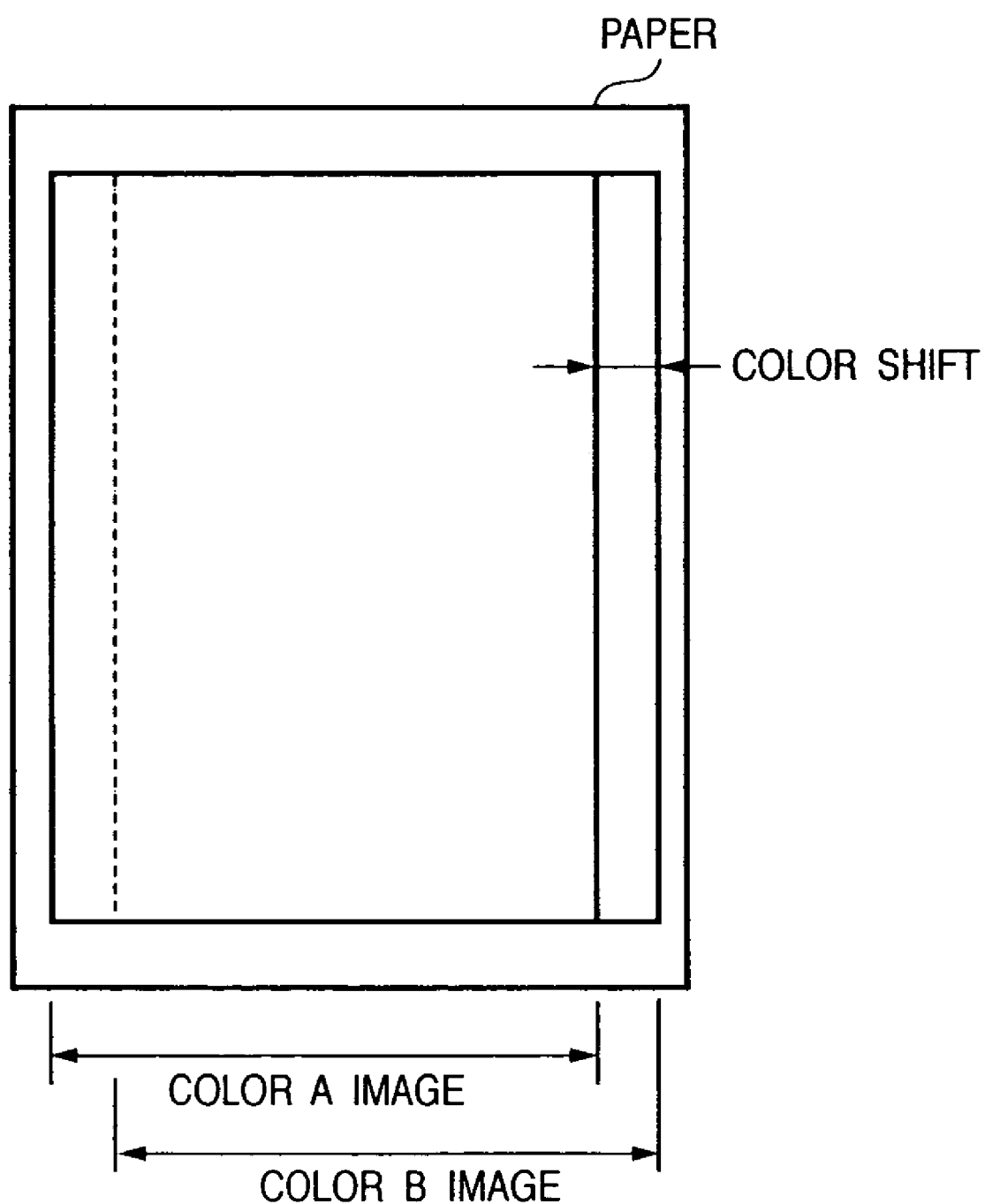
FIG. 7 is a diagram showing a formed image shift due to a draw start timing shift in relation to a color image.

FIG. 7 is a diagram showing a formed image shift due to a draw start timing shift in relation to a color image. In particular, with a color image forming apparatus like that shown in FIG. 1, the scanning direction of the laser beams of some lasers is the reverse of the scanning direction of the laser beams of other lasers. It can be seen that, as a result, the draw start timing causes color shift, dramatically degrading the quality of the formed image.

According to the invention according to the present invention, by switching the light emission timing depending on the laser light intensity setting, an image can always be formed at a stable location regardless of the laser light intensity. In particular, with a color image forming apparatus that forms a color image by superimposition of a plurality of images of different colors, and moreover where the scanning direction of images of certain colors is different from the scanning direction of the images of the other colors, color shift occurring in the main scanning direction can be reduced.

In addition, because the present invention does not switch the light intensity when scanning the photosensitive drum and when scanning the photo detectors as in Japanese Laid-Open Patent Publication No. 8-304723, complication of the control system can be eliminated and there is also a possibility that circuit scale can be reduced. In other words, so long as the resolution is not changed, the light intensity of the laser beam is not intentionally changed, either, and therefore laser beam light intensity control is simplified.

Second Embodiment

In the present embodiment, a description is given of an example of the calculation of the preferable light emission timing data at each light intensity.

Figure 8:
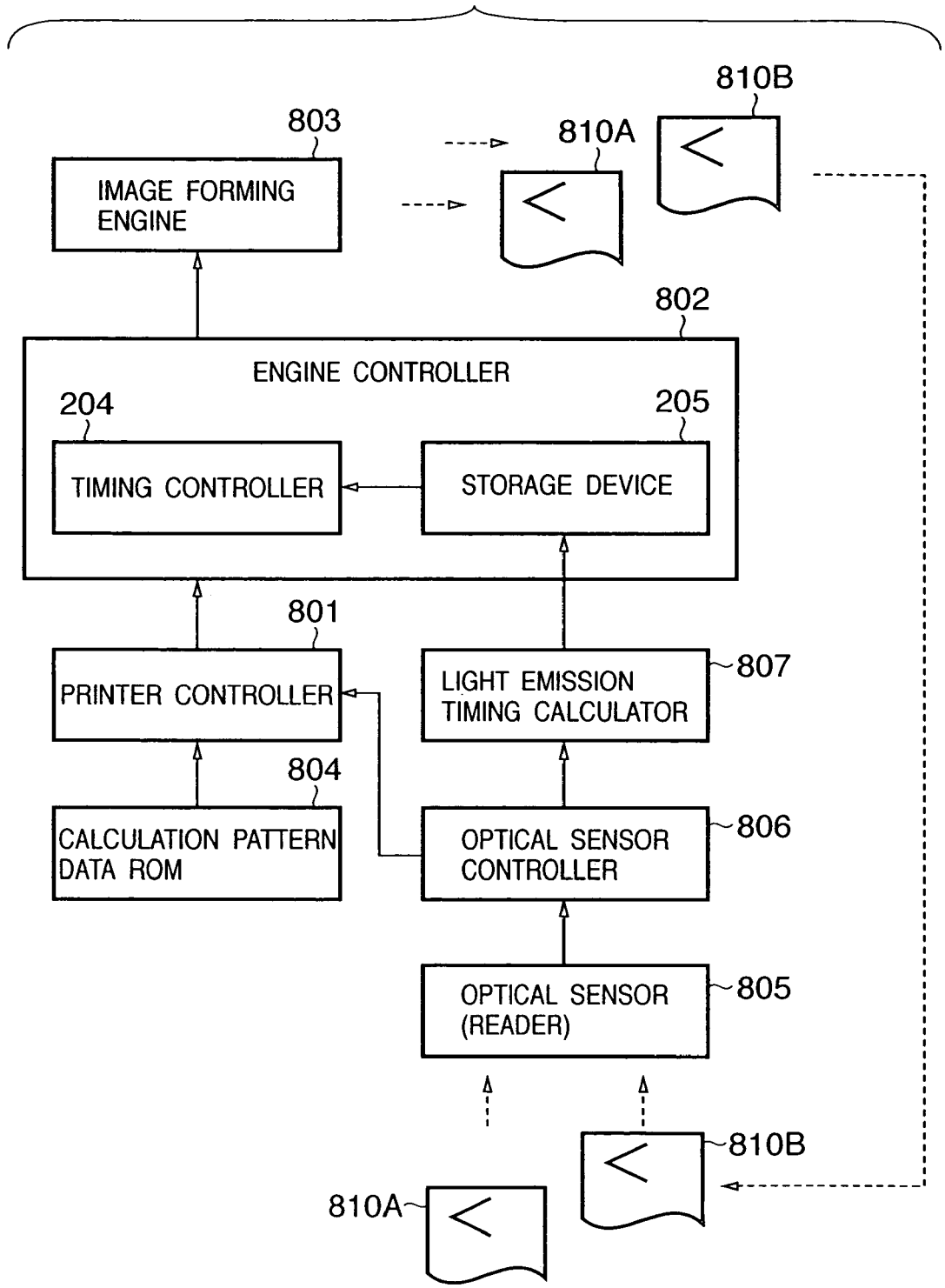
FIG. 8 is a diagram showing an example of an image forming apparatus according to the present embodiment.

FIG. 8 is a diagram showing an example of an image forming apparatus according to the present embodiment. Structures that are identical to those already described are allocated identical reference numerals, and a description thereof is omitted here.

A printer controller 801 is an image processing apparatus that performs image processing on image data input from an 806 optical sensor controller. Reference numeral 802 is an engine controller, which is a control device that controls an image-forming engine 803 based on image signals output from the printer controller 801. Included in the image-forming engine 803 are the lasers 101-104, the photosensitive drum 203, and, not shown, a fixing apparatus, a recording paper transport mechanism and the like. Included in the engine controller 802 are the above-described timing controller 204 and the storage device 205.

A calculation pattern data ROM 804 stores pattern data used in order to calculate light emission timing data. An optical sensor 805 is a detection device that optically detects a pattern formed on the recording paper. If the image forming apparatus is applied to a copier, the optical sensor 805 may be used as a document reader of the copier. If the image forming apparatus is not a copier, then the optical sensor 805 is disposed downstream from the fixing apparatus, within a recording paper transport path of the image forming apparatus. An optical sensor controller 806 is a processing circuit that creates image data based on data input from the optical sensor 805. A light emission timing calculator 807 is a calculation circuit that forms calculation patterns on recording paper at each of a plurality of light intensities and, by comparing the respective patterns thus formed, calculates a positional "shift" and the chronological timing shift that corresponds to that positional shift, and ultimately calculates light emission timing at each light intensity. The light emission timings thus calculated are then stored in the storage device 205.

Figure 9:
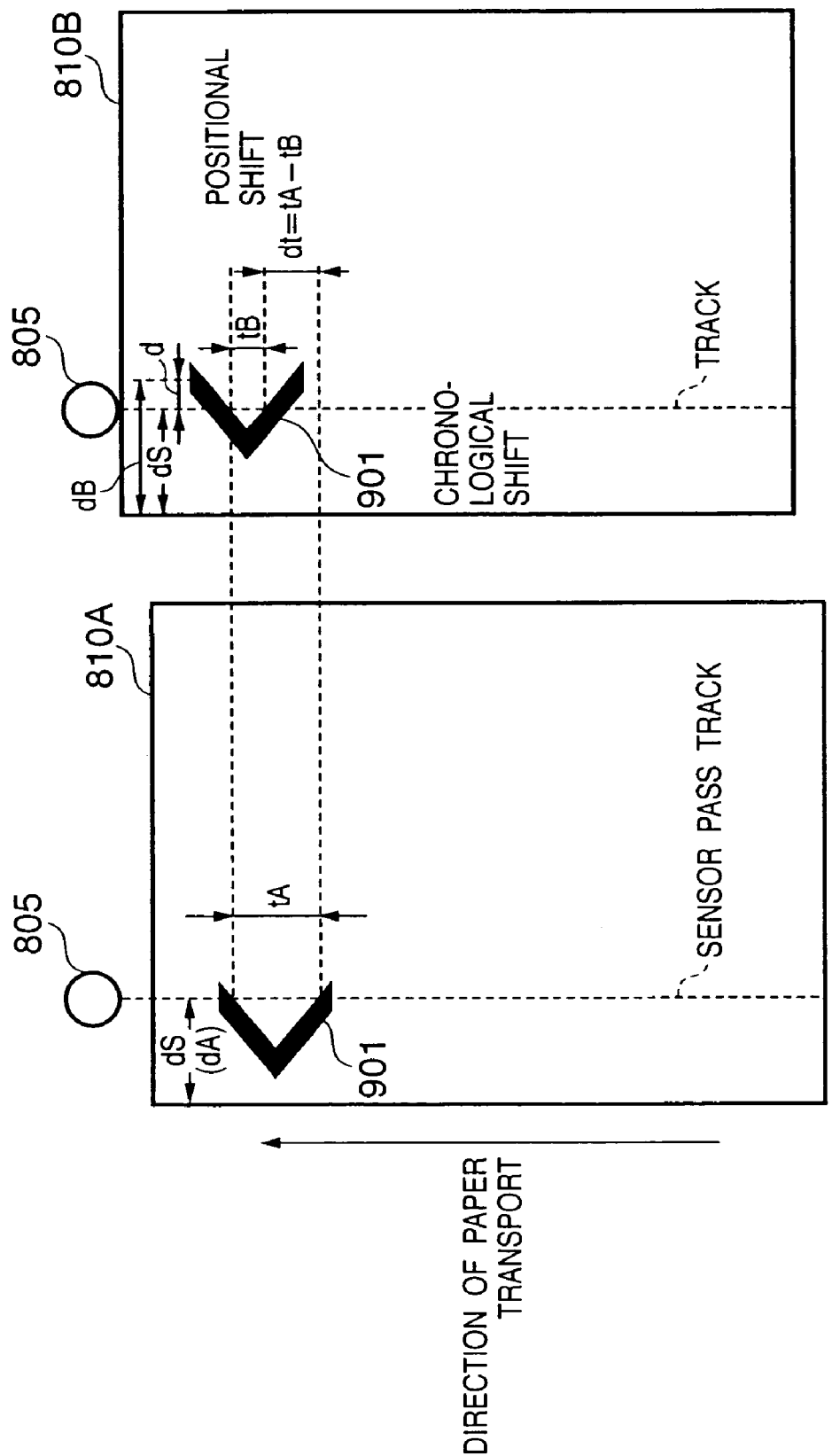
FIG. 9 is a diagram showing a plurality of sheets of recording paper on which a pattern used for calculation is formed using different light intensities.

FIG. 9 is a diagram showing a plurality of sheets of recording paper on which patterns used for calculation are formed using different light intensities. A sheet of recording paper 810A shows a pattern formed using light intensity A. A sheet of recording paper 810B shows a pattern formed using light intensity B. It should be noted that, during calculation, in the case of either light intensity A or light intensity B, an image is formed after the passage of an identical period of time after reception of a BD signal is counted. In other words, this arrangement does not employ the invention according to the first embodiment.

According to the example shown in FIG. 9, it can be seen that, compared to a pattern 901 formed with light intensity A, the pattern 901 formed with light intensity B is offset to the right by a distance d. This distance d corresponds to the drawing starting position described above. The track of the optical sensor 805 when it passes over the recording paper is a straight line offset a distance ds from the left edge of the recording paper. In addition, as shown in the diagram, a distance from the left edge of the recording paper to the top edge of a pattern shaped like the character "<" is dA on the recording paper 810A and is dB on the recording paper 810B. It should be noted that, in the present example, ds=dA. Accordingly, the distance d expressing the shift is d=dB−dA. A correction value t3 is determined according to a correction value table expressing the relation between the shift amount d and the correction value t3. It should be noted that the optical sensor controller 806 may also calculate dB and dA from the image data read by the optical sensor 805, and thus, for example, can be obtained as t3=k1·d, where k1 is a coefficient that expresses the relation between t3 and d. It should be noted that the functions expressing the relation between the two are not necessarily linear functions, and may be higher-order functions.

Alternatively, the light emission timing calculator 806 may count the time period from detection of the upper "/" portion of the character "<" by the optical sensor 805 to detection of the lower "\" portion of the character "<" by the optical sensor 805. As a result, the recording paper 810A detection time is tA, and the recording paper 810B detection time is tB. In addition, if the interior angle of the character "<" is 2θ and the recording paper transport speed is v, then the above-described shift amount d=(tA−tB)·v/tan θ. A shift amount d calculated in the foregoing manner may be used.

Furthermore, the above-described correction value t3 may be calculated using a measured time difference dt between tA and tB (where dt=tA−tB), and thus, for example, can be obtained as t3=k2·dt. Here, k2 is a function that expresses the relation between t3 and dt. Of course, depending on the characteristics of the image forming apparatus, the relation between t3 and dt may be expressed by a higher-order function.

Figure 10:
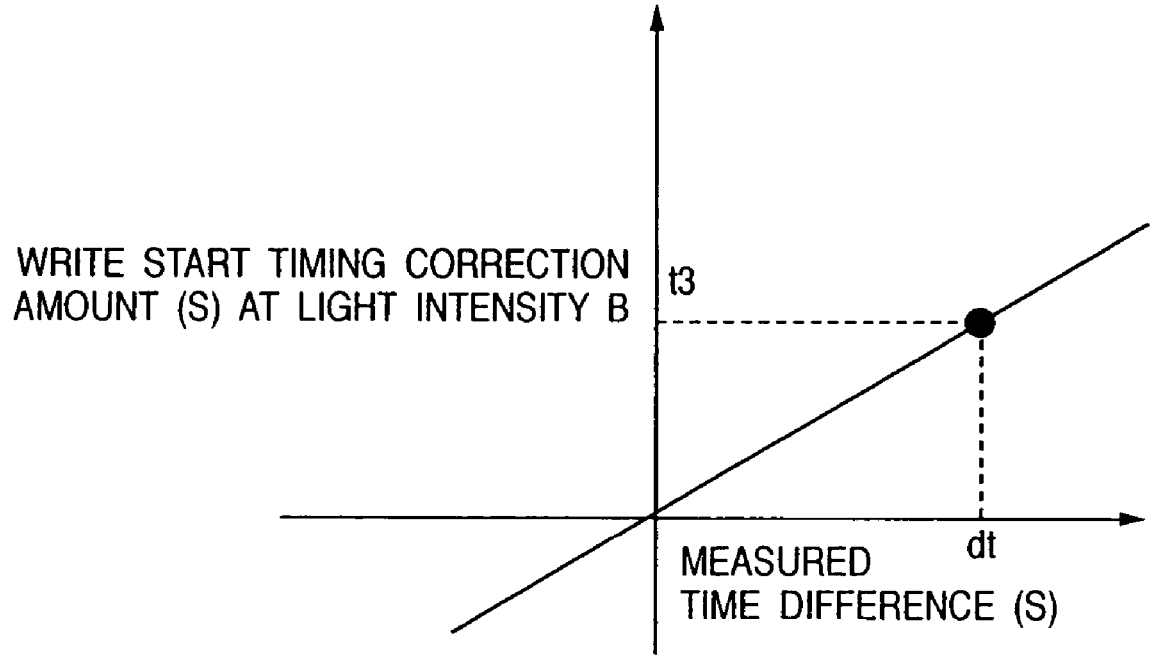
FIG. 10 is a diagram showing an example of a correction value table according to the present embodiment.

FIG. 10 is a diagram showing an example of a correction value table according to the present embodiment. In this example, the relation between the measured time difference dt and the correction value t3 is presumed to be given by t3=k2·dt.

Figure 11:
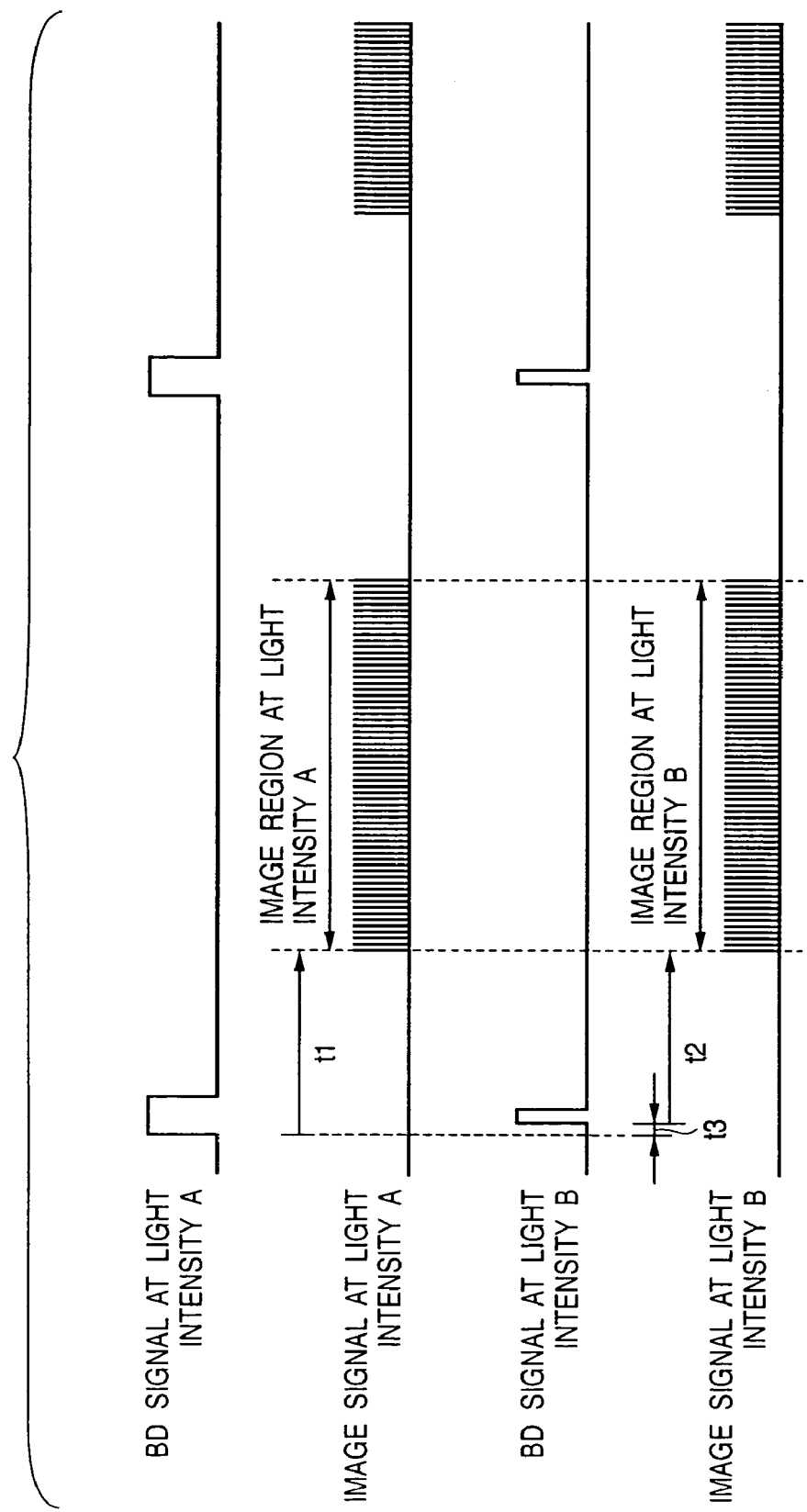
FIG. 11 is a diagram showing the relation between correction value and light emission timing at each light intensity according to the present embodiment.

FIG. 11 is a diagram showing the relation between correction value and light emission timing at each light intensity according to the present embodiment. In this example, for light intensity A, the time from BD signal pulse rise to light emission start timing is t1, the correction value is t3, and for light intensity A the time t2 from BD signal pulse rise to light emission start timing is t2=t1−t3. Here, if t1 is made the same as the light emission timing (t) when recording paper 810A and recording paper 810B are created, then t2 can be obtained by t2=t−t3. In other words, if recording paper 810A and recording paper 810B are formed at the same light emission timing (t), a shift equivalent to t3 occurs. The shift can be offset by correcting the light emission timing for one of the light intensities by the correction value t3.

Figure 12:
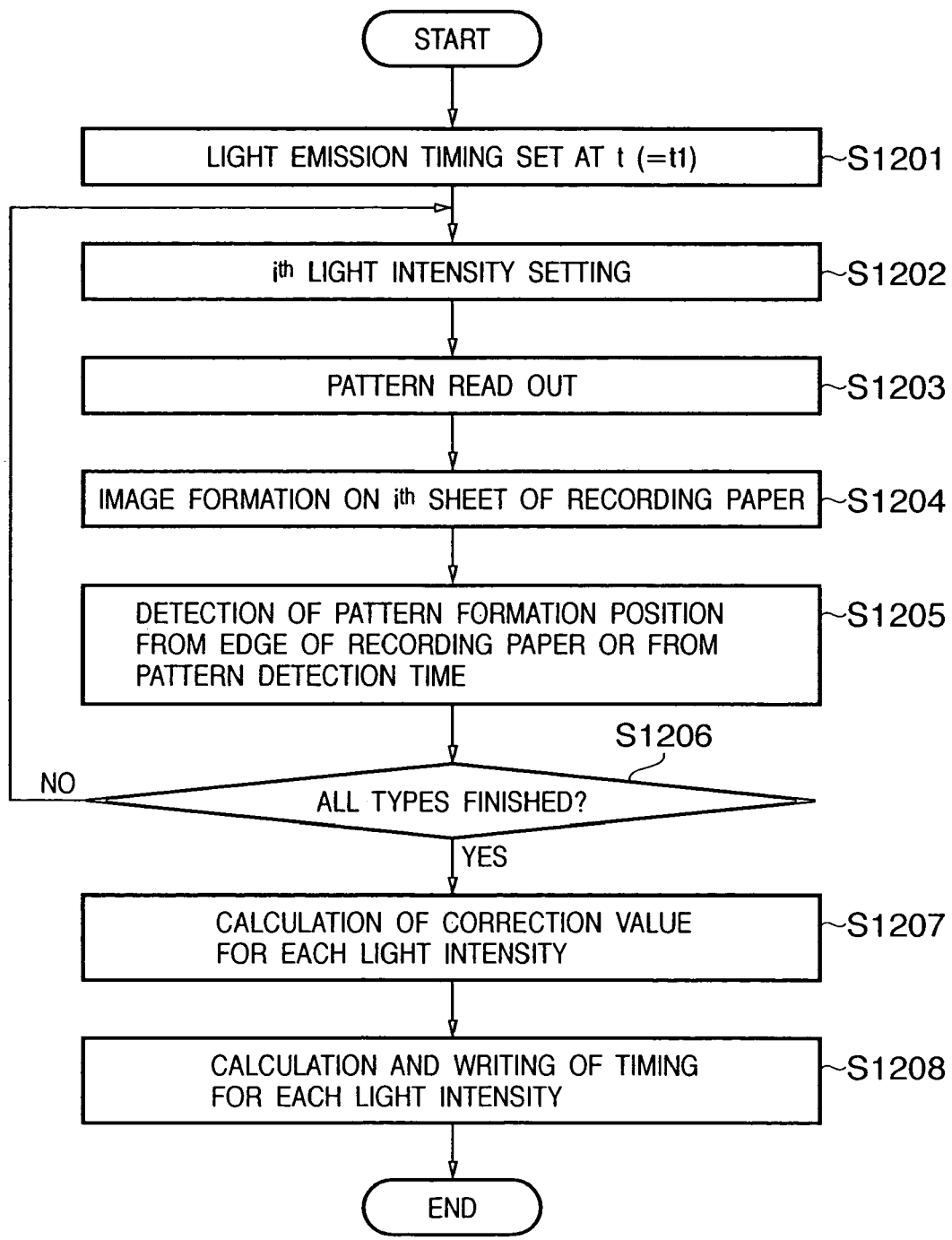
FIG. 12 is an illustrative flow chart of a light emission timing calculation process at each light intensity according to the present embodiment.

FIG. 12 is an illustrative flow chart of a light emission timing calculation process at each light intensity according to the present embodiment.

In step S1201, once the calculating process for the light emission timing is started, the timing controller 204 sets the light emission timing to t. It should be noted that this step may be eliminated if a default light emission timing is used.

In step S1202, the main controller 206 (the controller 801 or the engine controller 802) sets the $i^{th}$ light intensity in the timing controller 204 using the light intensity setting signal. It should be noted that the initial value for i is 1.

In step S1203, of the main controller 206, the controller 801 reads calculation pattern image data from the ROM 804.

In step S1204, the controller 801 generates an image signals for the read-out pattern image and sends it to the engine controller 802. The engine controller 802 uses the light intensity thus set to drive the image forming engine 803 so as to form an image in accordance with the image signal. Thus, as described in the foregoing, a calculation pattern is formed according to the $i^{th}$ light intensity on the $i^{th}$ sheet of recording paper.

In step S1205, the optical sensor 805 reads the calculation pattern formed on the $i^{th}$ sheet of recording paper. The data thus read is then converted into image data at the optical sensor controller 806. The light emission timing calculator 807, based on the $i^{th}$ image data, calculates a recording position for the character "<". Alternatively, the light emission timing calculator 807 detects the time difference from detection of the upper part "/" of the character "<" to detection of the lower part "\" of the character "<".

In step S1206, the main controller 206 determines if the calculation processes for pattern formation positions (or pattern detection time differences) for all types of light intensities are finished, and if so, the process proceeds to step S1207.

In step S1207, the light emission timing calculator 807, using, for example, the first sheet of recording paper as a reference, substitutes the pattern formation positions or the pattern detection time differences into the above-described equations and calculates correction values for the second and each succeeding sheet of recording paper thereafter. It should be noted that a sheet of recording paper other than the first sheet of recording paper may be used as the reference, and data that is previously stored in the storage device 205 may be used as the reference. If data actually read from a sheet of recording paper is used, then there is the advantage of being able to reduce the storage capacity instead of pre-storing the reference data.

In step S1208, the light emission timing calculator 807 calculates the light emission timing based on the respective correction values for the light intensities. When calculations are finished, the light emission timing calculator 807 creates a light emission timing table in which light intensity and light emission timing are correlated and the table is stored in the storage device 205.

Thus, as described above, with the image forming apparatus according to the present embodiment, mechanisms are installed in the image forming apparatus in order to optimize light emission timing, and therefore can dynamically cope with image shift brought about by variation in the components and by time-induced changes.

Third Embodiment

Figure 13:
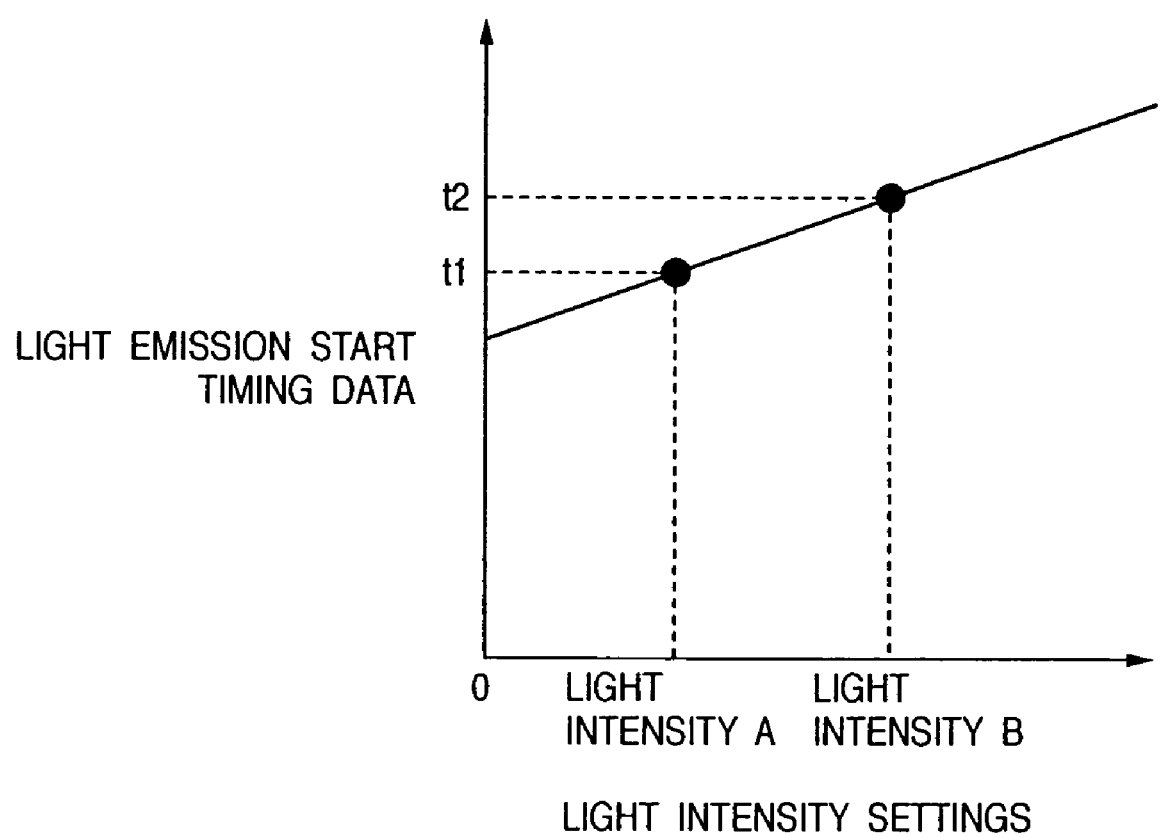
FIG. 13 is a diagram showing an example of a table showing the relation between light intensity settings and light emission timing data according to the present embodiment.

In the present embodiment, an example of a specific method for determining the light emission timing is shown. FIG. 13 is a diagram showing an example of a table showing the relation between light intensity settings and light emission timing data according to the present embodiment. The horizontal axis shows the light intensity settings and the vertical axis shows the light emission timing. In the example shown in the diagram, the light emission timing data is set at t1 seconds for light intensity A and at t2 seconds for light intensity B. This light emission timing data t1, t2 indicates the light emission starting time of the laser beams using the respective BD signal pulse rise times as references.

By referring to the table as described, a unique light emission timing can be determined from a given light intensity. The table can be stored in the storage device 205. The storage device 205 outputs light emission timing data corresponding to the light intensity setting signal output from the main controller 206 to the timing controller 204. Alternatively, the timing controller 204 may read the light emission timing data corresponding to the light intensity setting signal output by the main controller 206 from the storage device 205 table. The timing controller 204 controls the light emission timing of the lasers 101-104 based on the light emission timing data.

According to the present embodiment, the calculation sequence for calculating the light emission timing data, the correction values and the like can be eliminated. As a result, light emission timing shift caused by differences in light intensity can be reduced without degrading image forming apparatus throughput. That is, stable light emission timing can be obtained without relying on light intensity.

Fourth Embodiment

In the foregoing embodiments, the pulse rise time of the signals output from the optical sensors 106, 107 are used as references by which to control the starting time of light emission. In other words, the time from the pulse rise to the start of light emission is optimized for a given light intensity so as to be able to emit light at essentially the same timing even as the light intensity changes.

The present embodiment uses as a reference the time after the above-described pulse rise but before the trailing edge. In other words, the present embodiment divides the pulse width of the BD signals output from the BD sensors 106, 107 that function as detection units into predetermined proportions and uses the dividing point as the reference to determine the aforementioned light emission timing. That is, in the present embodiment, by changing the reference time at the BD signals according to differences in light intensity, the above-described "shift" can be absorbed. Consequently, even if the light intensity changes, the time interval from the reference time to the start of light emission can be made to be essentially the same value.

FIG. 14 is a diagram showing a reference timing determination principle according to the present embodiment. Specifically, the diagram shows that, for light intensities A, B, respectively, the output from the BD sensors 106, 107 (the BD signals) and the reference time for the light emission timing.

The extent of the change in the pulse rise and fall times of the BD signals attendant upon the change in light intensity is known from experiment to be approximately linear. For example, in the case of a BD sensor having a light intensity dependency like that shown in FIG. 14, by using the dividing point of a division of the pulse width of the BD signal as a proportion of 1:2 as the reference time of the light emission timing count, shift of the light emission timing due to dependence on light intensity can be reduced.

It should be noted that the 1:2 divisional ratio is merely illustrative, and that in actuality any ratio appropriate for the characteristics of the BD sensors employed in the image forming apparatus may be employed. In other words, the divisional ratio can be m:n (where m, n are natural numbers).

In addition, the time interval t from the reference time determined in the foregoing manner to the light emission starting time may be changed depending on differences in light intensity, or fixed regardless of the light intensity, because in either case, the time interval t and the divisional ratio may be set so that, ultimately, the light emission timing is synchronized. Furthermore, the divisional ratio may differ with each light intensity or fixed regardless of the light intensity. In this case, too, the time interval t from the reference time to the light emission time may be determined in each case in such a way that, ultimately, the light emission timing is synchronized. It should be noted that using the same divisional ratio (that is, dividing the pulse into two equal halves), as compared to a case of adopting a plurality of divisional ratios, has the advantage of allowing the storage capacity necessary to store the divisional ratios in the storage device 205 to be freed for other uses. The effect of such storage capacity economization is very great in the case of an image forming apparatus that uses a variety of light intensities in order to cope with image formation using multiple resolutions.

It should be noted that these parameters may be calculated at design time and stored in the storage device 205, with the timing controller 204 reading out these parameters from the storage device 205 and using them. Alternatively, controllers such as the timing controller 204 or the like may dynamically calculate these parameters during operation. In the case of the former, there is the advantage that the calculation sequence can be eliminated. In the case of the latter, there is the advantage of being able to cope appropriately with variations in the precision with which components of individual image forming apparatuses are produced and the changes these components undergo over time.

As described above, according to the present embodiment, a point other than the BD signal pulse rise time can be used as the reference time when defining the light emission timing, thus conferring the advantage of enhanced design freedom. Of course, as with the other embodiments described above, shift in the light emission timing due to dependence on light intensity can be reduced.

Other Embodiments

In the foregoing embodiment, the light emission timing is determined according to the set light intensity. However, the light emission timing may be determined in accordance with data other than the set light intensity. For example, if the set resolution and the laser light intensity are in a one-to-one correspondence, then the light emission timing can be controlled by set resolution data from the printer controller or the like.

In addition, the light intensity may be measured by the BD sensors 106, 107 or by photodiodes inside the lasers 101-104 and the draw start timing control actively executed according to the measured light intensity. In other words, in place of the light intensity setting signal described above, the timing controller 204 uses the measured light intensity to select the preferable light emission timing.

With the second embodiment, although the character "<" is used when calculating the light emission timing correction value, another pattern may be used, provided that it is based on the character "<". A pattern based on the character "<" here means a valid geometric pattern when calculating the above-described correction value and light emission timing. Provided that the pattern has some sort of relation (for example, proportional or inversely proportional) between horizontal shift and vertical shift, for example, "A", "∠", "○" or the like, any geometric pattern may be employed. In all cases, the pattern is a figure that enables the correction value and light emission timing to be calculated.

It should be noted that the selection of the light emission timing means not only selecting the best light emission timing from among a plurality of light emission timings but also calculating the preferable light emission timing as well as reading out the preferable light emission timing data from the storage device.

Note that the present invention can be applied to an apparatus comprising a single device or to a system constituted by a plurality of devices, for example, scanner, printer, PC, copier, multifunction device or facsimile machine.

Furthermore, the invention can be implemented by supplying a software program, which implements the functions of the foregoing embodiments, directly or indirectly to a system or apparatus, reading the supplied program with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by a interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (WorldWideWeb) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-096651 filed on Mar. 29, 2004, the entire contents of which are hereby incorporated by reference herein.

What is claimed is:

1. An image forming apparatus in which a light intensity of a light beam used in latent image formation is switched in response to a change in resolution, comprising:
   a light emission unit that emits a light beam in order to form a latent image on a photosensitive drum;
   a scanning unit that scans the emitted light beam;
   a detection unit that detects the scanned light beam;
   a selection unit that selects a light emission timing according to the intensity of the light beam or the resolution when controlling a light emission timing of the light emission unit in response to a detection timing of the detected light beam, wherein the selection unit includes a light emission timing determination unit that determines the light emission timing using as a reference a dividing point that divides a pulse width of a signal output from the detection unit into predetermined proportions; and
   a control unit that controls the light emission timing of to light emission unit in accordance with the selected light emission timing,
   wherein the dividing point is determined based on a ratio between an amount of deviation in pulse rise time from said detection unit and an amount of deviation in pulse falling time of the output signal.

2. The apparatus according to claim 1, further comprising a storage unit that stores data on light emission timing according to the intensity of the light beam or the resolution, and wherein the selection unit selects the light emission timing by reading out front the storage unit the data on light emission timing according to the intensity of the light beam or the resolution.

3. The apparatus according to claim 2, wherein the storage unit stores a table describing a relation between the intensity of the light beam or the resolution, and the light emission timing.

4. The apparatus according to claim 2, further comprising:
   a reading unit that reads a pattern formed on a recording medium by the light beam of predetermined light intensity;
   a calculation unit that calculates a shift amount from a reference pattern for the read pattern; and
   a writing unit that writes data on light emission timing according to the calculated shift amount to the storage unit.

5. The apparatus according to claim 4, wherein the pattern is a pattern based on the character "<".

6. The apparatus according to claim 1, wherein the image forming apparatus comprises a plurality of light emission units as the light emission unit, and some of the light beams emitted from the plurality of light emission units are scanned in a direction different from the direction in which the remaining light beams are scanned.

* * * * *

UNITED STATES PATENT AND TRADEMARK OFFICE
CERTIFICATE OF CORRECTION

| | | |
|---|---|---|
| PATENT NO. | : 7,277,113 B2 | Page 1 of 1 |
| APPLICATION NO. | : 11/087653 | |
| DATED | : October 2, 2007 | |
| INVENTOR(S) | : Fumitaka Sobue et al. | |

It is certified that error appears in the above-identified patent and that said Letters Patent is hereby corrected as shown below:

COLUMN 12
      Line 39, "to" should read --the--; and
      Line 49, "front" should read --from--.

Signed and Sealed this

Fifth Day of August, 2008

JON W. DUDAS
*Director of the United States Patent and Trademark Office*